Dec. 2, 1941.   H. T. LAMBERT ET AL   2,264,537
BRAKE CONTROL SYSTEM
Filed Oct. 4, 1940   4 Sheets-Sheet 3
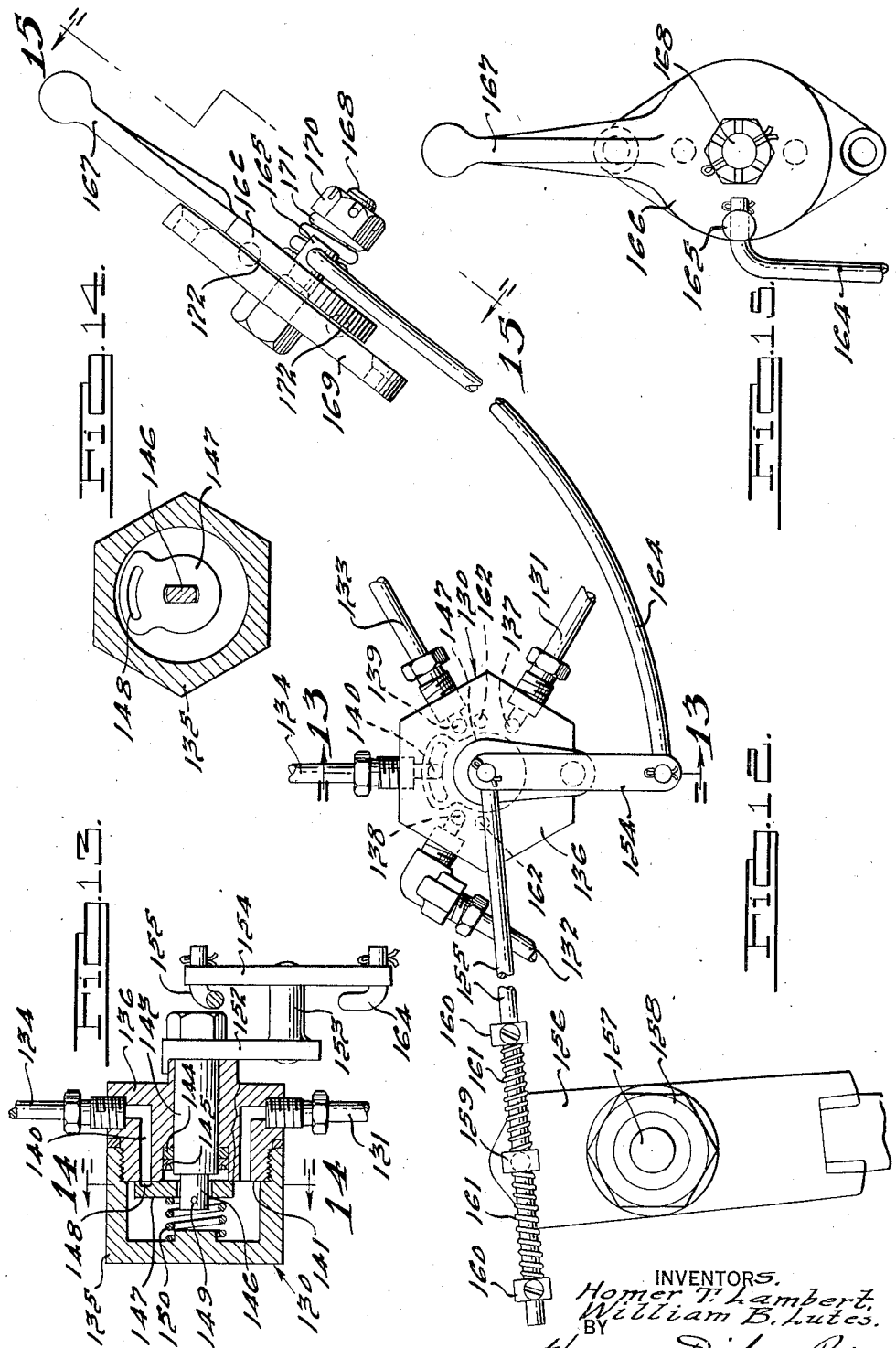
INVENTORS.
Homer T. Lambert.
William B. Lutes.
BY
ATTORNEYS.

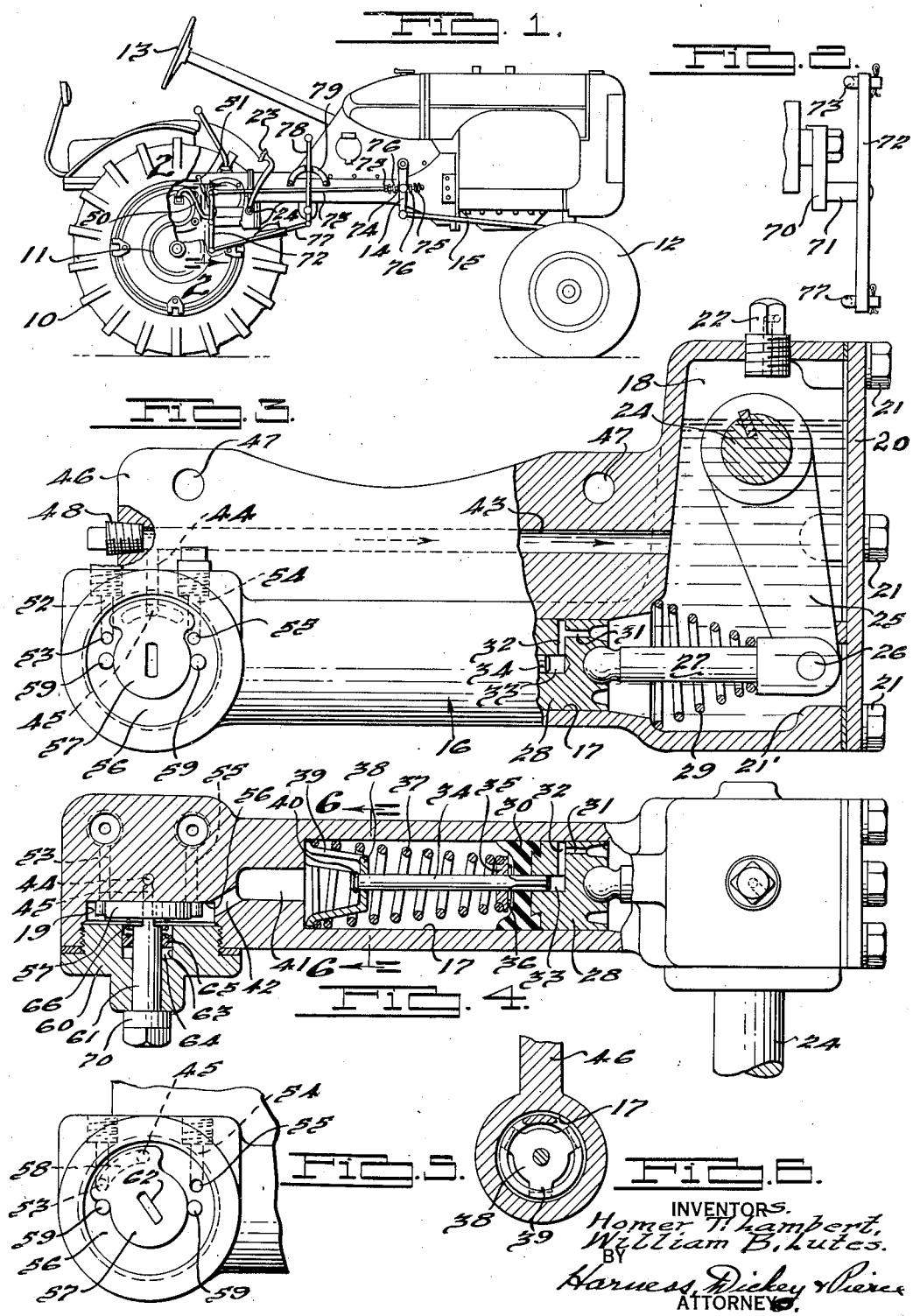

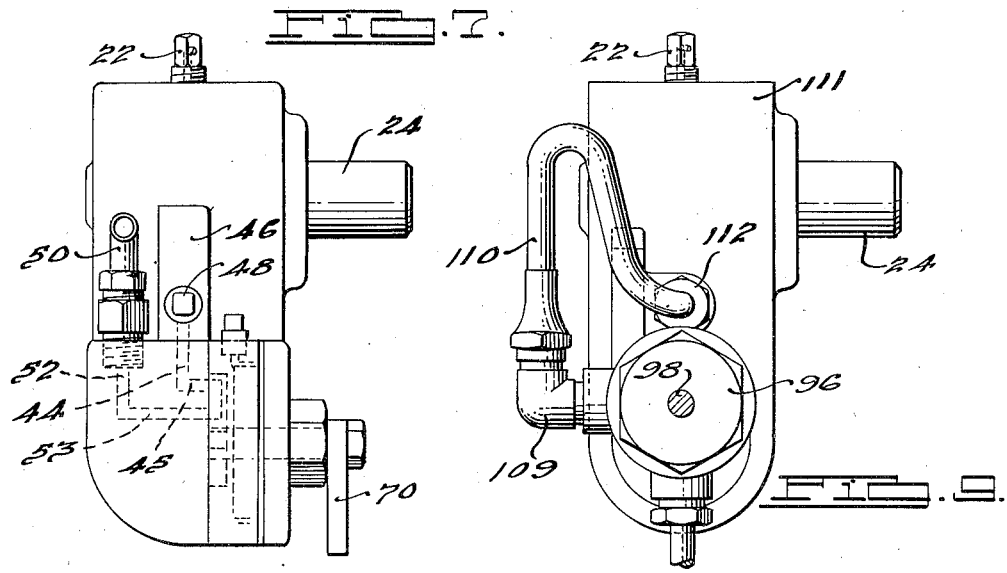
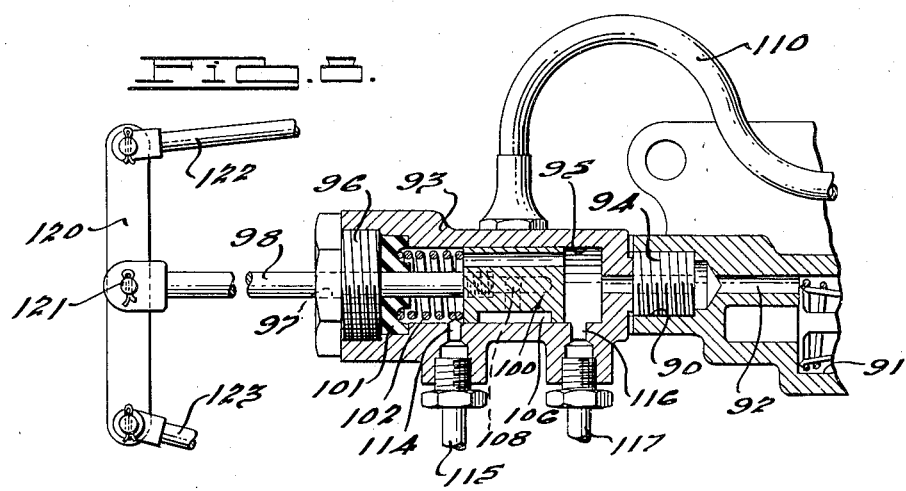
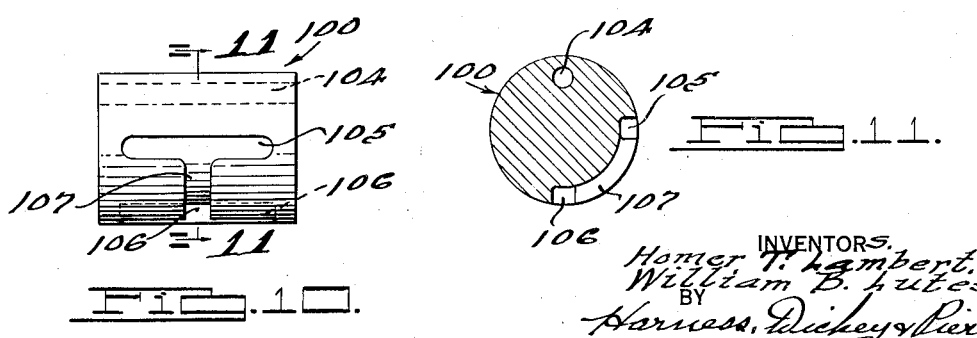

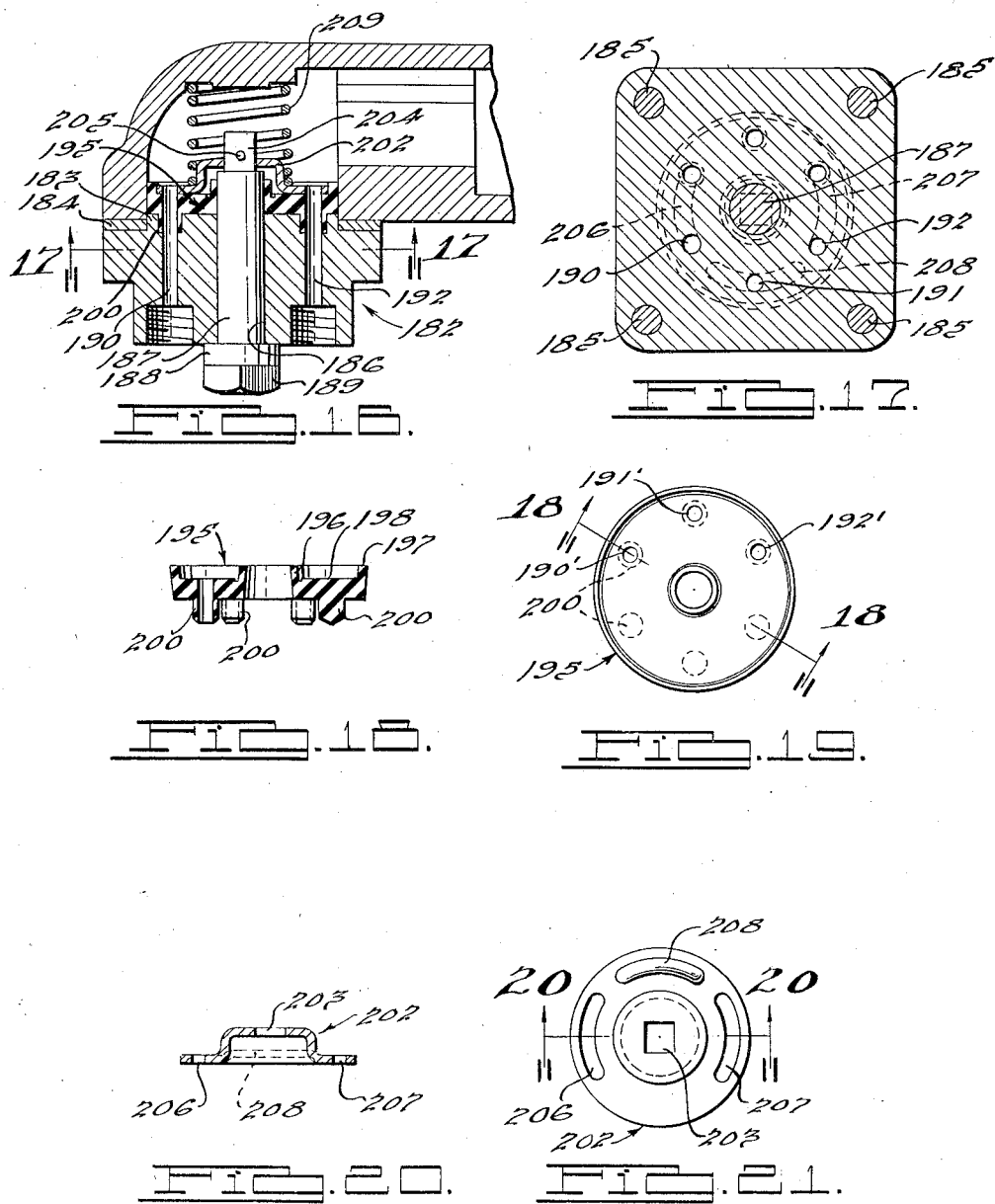

Patented Dec. 2, 1941

2,264,537

UNITED STATES PATENT OFFICE 2,264,537

BRAKE CONTROL SYSTEM

Homer T. Lambert and William B. Lutes, St. Joseph, Mich.; said Lutes assignor to Auto Specialties Manufacturing Company, St. Joseph, Mich., a corporation of Michigan Application October 4, 1940, Serial No. 359,766

6 Claims. (Cl. 180—18)

The present invention relates to tractors and particularly to means for facilitating steering thereof by selective application of the brakes.

It is a general object of the invention to provide improved means to facilitate the making of sharp turns with a tractor by selective application of the brakes.

One more specific object of the invention is to provide means in connection with a wheeled tractor having a dirigible front wheel to facilitate making sharp turns by automatically rendering inoperative one of the rear wheel brakes when the front dirigible wheel has been turned beyond the angle required for normal turns, so that the driver may, by applying the brakes, actuate only the brake on the wheel on the inside of the curve.

Another object of the invention is to provide an improved device of the type described embodying auxiliary manual control means which may be operated at any time to control the brake application regardless of the position of the dirigible wheel.

Another object of the invention is to provide an assembly of a hydraulic master cylinder and selective valve mechanism for selectively controlling application of the brakes.

Other objects and advantages of the invention will become apparent from the following specification, the accompanying drawings, and the appended claims.

In the drawings:

Figure 1 is a side elevation of a conventional form of tractor with parts being broken away to show some of the interior construction.

Figure 2 is a fragmentary end elevation taken on the line 2—2 of Figure 1.

Figure 3 is a side view of the preferred master cylinder and control valve assembly with parts broken away and the valve housing cover removed.

Figure 4 is a top view of the master cylinder assembly of Figure 3 partly in section.

Figure 5 is a fragmentary view, corresponding to Figure 3, showing the control valve in a different position.

Figure 6 is a fragmentary section taken on the line 6—6 of Figure 4.

Figure 7 is a left end view of a master cylinder and control valve assembly.

Figure 8 shows a fragmentary side elevation, partly in section, of a modified form of control valve adapted to be used with the master cylinder of the previous modification.

Figure 9 is an end view of a modification shown fragmentarily in Figure 8.

Figure 10 is a side elevation of the valve element of the modification shown in Figure 8.

Figure 11 is an end view of the valve element shown in Figure 10;

Figure 12 shows an assembly view of a further modification of the invention adapted for installation upon existing tractors which are already provided with master brake cylinders;

Figure 13 is a section taken on the line 13—13 of Figure 12;

Figure 14 is a section taken on the line 14—14 of Figure 13;

Figure 15 is a rear elevation of the manual control lever assembly, taken on the line 15—15 of Figure 12;

Figure 16 is a sectional view similar to the view shown in Fig. 4 of a further modified form of control valve which may be utilized in place of that illustrated in Fig. 4;

Figure 17 is a section taken on the line 17—17 of Fig. 16;

Figure 18 is a section taken on the line 18—18 of Fig. 19 of the valve seat and sealing element utilized in the valve of Fig. 16;

Figure 19 is a top view of the valve seat element shown in Fig. 18;

Figure 20 is a sectional view of the valve element shown in Fig. 16; and,

Figure 21 is a top view of the valve element shown in Fig. 20.

Referring to the drawings, there is shown in Figure 1 a view of a conventional tractor having a pair of driving wheels 10, one at each side of a transverse axle 11, mounted at the rear of the tractor. Only one of the driving wheels 10 appears in the view, the other being broken away to show some of the interior construction. The tractor is provided with front wheels 12 which are mounted in any conventional or suitable manner for steering and the wheels 12 are steered by means of a steering wheel 13 which acts through a steering arm 14 and rod 15 in the usual manner. Each of the rear wheels of the tractor is provided with a hydraulic brake (not shown) which may be of any desired form and construction but is preferably of the type disclosed in the Homer T. Lambert Patents Nos. 2,063,444, 2,099,489, 2,161,359, and 2,161,360.

The brakes of the rear wheels are energized by a master cylinder assembly, shown best in Figures 3 to 7. This assembly comprises a unitary casting, indicated generally at 16, which is provided with a central cylindrical bore 17, which is the brake master cylinder itself, a brake fluid reservoir 18 at one end of the cylinder 17 and a valve housing 19 at the opposite end of the cylinder 17. The reservoir 18 is completed and closed by a cover plate 20 which is held in place by any suitable means such as cap screws 21, extending in suitable bosses 21' in casting 16. The reservoir is provided with a suitable filler opening closed by a plug 22. A brake operating pedal 23 is pivoted on a brake shaft 24 which extends into the reservoir 18 and carries an arm 25 which is connected by a pin 26 and a push rod 27 to a brake actuating piston 28 positioned within the cylinder 17. A suitable spring 29 seats at one end against the casting 16 and at the other against a shoulder on the push rod 27 thereby acting in a direction to return the pedal to released position.

The piston 28 is provided with a rubber disc 30 on its forward face adapted to seal it against leakage between the piston and the cylinder wall. There is provided, however, a plurality of communicating passageways 31, 32, and a central bore 33 by means of which fluid may under certain circumstances flow through the piston. Extending into the central bore 33 of the piston is valve rod 34 having its righthand extremity, which is located within the bore 33, of approximately square cross-section in order that fluid may flow past the rod 34 within the bore 33. Welded to the rod 34 adjacent the piston 28 is a valve disc 35 having a seating edge 36 adapted when seated against the rubber disc 30 to close communication through the passages 31 and 32 and bore 33. A spring 37, positioned within the cylinder, normally acts upon the valve disc 35, forcing it against the piston thereby acting to maintain the valve closed and at the same time to urge the piston 28 toward brake release position. The lefthand extremity of the valve rod 34 is guided by means of a spider 38 having three legs 39, against the out-turned extremities of which seats the spring 37. The snap ring 40 is seated within a suitable groove in the lefthand extremity of the valve rod 44 and acts to limit movement of the valve rod to the right under the influence of spring 37. The parts are so proportioned that when the foot pedal is released, spring 29 shifts the pedal and piston 28 far enough to the right so that a slight opening of valve 35, 36 occurs. As a result, when the brakes are in released position, fluid may flow from the reservoir 18 through passages 31 and 32 and bore 33 to the left-hand side of piston 38 thereby compensating for any leakage which might occur in the pressure lines to the brakes. The lefthand extremity of the cylinder 17 is connected by a counterbore 41 to passageway 42 to the interior of the valve housing 19.

The reservoir 18 is also connected to the interior of the valve housing 19 by means of the intersecting passageways 43, 44, and 45. The bore 43 is positioned within an upstanding fin 46 which is provided with a pair of openings 47 for reception of bolts by means of which the assembly may be mounted on the frame of the tractor. The lefthand extremity of the bore 43 is closed by suitable plug 48.

A pair of fluid pressure brake lines 50 and 51 are connected by suitable fittings to the casting 16 in communication with intersecting bores which connect the pressure lines to the valve housing, the pressure line 50 being connected to the valve housing by intersecting passages 52 and 53, while the pressure line 51 is connected to the housing by passages 54 and 55. As best shown in Figure 3, the passages 45, 53, and 55 enter the valve housing at the back thereof through a back wall having a flat surface 56 adapted to receive the movable valve element 57. The valve element 57 which seats against the face 56 is provided with an arcuate groove 58 in its back face of sufficient length, as best shown in Figure 5, to extend between and provide communication between the passageways 45 and 53 or between the passageways 45 and 55, depending upon the position of the valve element 57. The groove 58 is always in communication with passage 45 and the valve element 47 is normally held in the position shown in Figure 3, as will be hereinafter set forth, in which position the passage 45 is disconnected from both of the passages 53 and 55. A pair of stop pins 59 are provided for limiting movement of the valve element 57 in its two extreme positions.

The valve housing 19 is closed by means of a screw-threaded plug or cover plate 60 having a valve operating shaft 61 extending therethrough and provided with a flattened end portion 62 which is fitted within a suitable slot in the movable valve element 57. The bore in plug 60 through which the valve operating shaft 61 extends is provided with a counterbore 63 within which is seated a collar 64 welded to the valve shaft 61. The collar 64 serves to prevent outward movement of the shaft 61 as the result of pressure existing within the valve housing. A suitable packing 65 surrounds the valve shaft 61 to prevent leakage. A spring 66 surrounding the valve shaft 61 seats at one end against the packing 65 and at the opposite end against the movable valve element 57, serving to hold the latter against the face 56.

The valve 57 which, as will be apparent, is of the four-way type, is operated by means of a lever 70, shown best in Figures 2 and 4, which is fixed to the valve operating shaft 61 and depends therefrom. The lower end of the lever 70 is provided with a stud 71 on which is pivoted a floating lever 72. The upper end of the floating lever is connected, as best shown in Figures 1 and 2, to a forwardly extending rod 73 which extends loosely through an opening in a stud 74 that projects laterally from the steering arm 14. Suitable stop collars 75 and springs 76, surrounding the shaft 73 on opposite sides of the stud 74, serve to hold the rod 73 resiliently against sliding movement within the stud 74.

It will be apparent from the above that when the tractor is steered, movement of the steering arm 14 will tend to shift rod 73 and thereby the four-way valve 57. The parts are so arranged that the dirigible wheels 12 of the tractor must be turned through a predetermined angle before the valve 57 is shifted from the position shown in Figure 3 to the position shown in Figure 5, in which latter position one of the brakes is rendered inoperative. The angle through which the dirigible wheels 12 must be turned to complete shifting of valve 57 is a matter of choice, but it is preferred that this angle be in the order of 35° in order that normal steering movements of the wheels may be effected without affecting the braking system of the tractor. It is only when it is desired to make an abnormally sharp turn that it is necessary to apply the brakes to one of the tractor's rear wheels and it is, therefore, quite important to prevent application of only a single rear wheel brake during normal maneuvering as accidents may otherwise occur.

It will be noted, as best shown in Figures 4 and 5, that when the valve 57 is shifted to its extreme counter-clockwise position, in which passages 45 and 53 are connected and communication is closed between passage 53 and the interior of the valve housing. If the brakes are applied when the valve is in this position, the fluid pressure from the master cylinder 17 passes through the passages 41 and 42 to the interior of the valve housing 19 and thence through passages 55 and 54 to the pressure line 51 which is connected to the brake on the righthand driving wheel. It will be understood that valve 57 is shifted to this position when the dirigible wheels 12 of the front of the tractor are turned to the right a predetermined amount, by reason of forward movement of the steering arm 14 and drag link 15. Thus, when the dirigible wheels 12 are turned to the right to the desired degree, and the driver desires to make a still sharper turn to the right, all he need do is apply the brake by means of the foot pedal 23, thereby stopping the right driving wheel 10 and swinging the forward end of the tractor about the right driving wheel by reasons of the propulsive effect of the lefthand driving wheel. This enables the making of sharp turns at the ends of a row in plowing, cultivating, or the like with a minimum loss of time or expenditure of effort.

It should be noted that when the valve 57 is shifted to the left under these conditions, the brake line 50 to the lefthand brake is vented through passages 52, 53, groove 58, passages 45, 44, and 43 to the reservoir. This insures that the lefthand brake will be fully released even though it may have been applied at the time valve 57 was shifted.

It will be understood that when the dirigible wheels 12 are turned to the left, rearward movement of the steering arm 14 which effects such steering movement will shift rod 73 to the rear thereby causing clockwise rotation of lever 70 and valve 57 when the desired amount of rightward turning has occurred. Communication between the brake cylinder 17 and passage 55 will be closed and the latter passage 55 will be vented to the reservoir through groove 58 and passage 45, etc. As a result, subsequent operation of the brake pedal will cause application of only the brake on the lefthand wheel thereby effecting a sharp left turn.

The lower end of lever 72 is connected by means of a rod 77 to a hand lever 78 mounted upon the tractor frame and associated with any suitable form of ratchet mechanism such as an arcuate bar 79 provided with notches (not shown) for engaging the lever 78 and holding it in any desired position of adjustment. It will be apparent, by reason of the fact that the lever 78 is connected to the opposite end of the same floating lever 72 to which the steering arm 14 is connected, that it is possible by means of the handle 78 to shift valve 57 to any desired position at any time regardless of the position of the dirigible wheels 12. Accordingly, the driver can manipulate the brakes individually at will if desired.

In Figures 9 to 11, inclusive, is shown a modified form of the invention similar in all respects to that just described except that the four-way valve is of a different type and is positioned within a separate casting from the master cylinder. The master cylinder itself is identical to that previously described except that the casting of which it is formed terminates with a threaded bore 90 which communicates with the interior of the master cylinder 91 by means of a passage 92. The valve housing 93 is provided with a threaded nipple 94 which is threaded within the threaded bore 90 of the master cylinder casting. The valve housing is provided with a longitudinally extending bore 95 which is closed by means of a threaded plug 96, having a central opening 97 through which projects a valve operating rod 98. Threaded on the rod 98 within the bore 95 is a cylindrical valve element indicated generally at 100, shown best in Figures 8, 9, and 10. A suitable packing ring 101 seals the valve housing against leakage around the valve stem 98. A spring 102 surrounds the stem 98 between the valve 100 and the packing ring 101. This spring serves to hold the packing ring 101 in place and operates to balance the valve element against the result of unequal areas at opposite ends thereof. The valve 100 is generally cylindrical in form and is provided with a longitudinally extending passageways 104 extending throughout its length in order to balance the pressures at opposite ends of the valve. Spaced at an angle of 90° around the periphery of the valve 100 are a pair of longitudinal slots 105 and 106 connected by a peripheral slot 107. Slot 105 in all positions of adjustment of the valve communicates with a port 108 in the valve housing which, in turn, communicates through suitable fittings 109 with a pipe 110 which is connected, in turn, to the reservoir 111 by means of a fitting 112. The slot 106, when the valve is in its normal or central position, shown in Figure 8, does not communicate with anything. However, when the valve is shifted to the left, this slot 106 communicates with a pipe 114 connected to a pressure line 115 leading to the brake on one of the rear wheels. When the valve 100 is in its righthand position, slot 106 communicates with a passage 16 which in turn is connected to a pressure line 117 which runs to the brake on the opposite rear wheel of the tractor. As a result, it will be noted that when the valve 110 is in the central position, pressure from the master cylinder 91 has free passage to both of the passageways 114 and 116 and, therefore, to both brakes of the tractor. However, when the valve 100 is shifted to the left and the brakes applied, the fluid pressure from the master cylinder 91 will flow to passageway 116 and pressure line 117 to one of the brakes, but no flow can take place to the passage 114 or line 115 and the brake on the other wheel. On the contrary, in this position of the valve, passage 114 and pressure line 115 are connected through grooves 106, 107, and 105 to passageway 108 and line 110 to the reservoir 111, thus venting the brake connected to pressure line 115 and insuring release thereof. The opposite brake may be applied when the valve is shifted to its righthand position.

Valve 100 is operated by means of a floating lever 120 pivoted intermediate its ends by means of a pin 121 on the extremity of the valve operating valve 98. The upper end of lever 120 is connected by a rod 122 to the steering arm of the tractor in the manner indicated in Figure 1, while the lower end of floating lever 120 is connected by means of a rod 123 to any suitable form of hand lever provided with a suitable detent mechanism.

In this form of the invention, when the dirigible wheel 12 of the tractor are turned to the right a predetermined amount, forward movement of the steering arm 14 (Figure 1) will pull rod 122 (Figure 8) to the right, shifting valve 100 to the right and permitting application of the brake connected to pressure line 115 which in this case should be the righthand brake. The lefthand brake is connected to pressure line 117.

In both of the previously described modifications of the invention, it will be understood that any type of steering mechanism for the front dirigible wheels may be provided and that any type of brake mechanism may be provided on each of the rear wheels. All that is required is that upon steering movement of the front dirigible wheels to the right, that only the righthand brake be in condition for application after the dirigible wheels have been turned beyond a predetermined angle and vice versa.

In Figures 12 to 15, inclusive, is shown a further modification of the invention in which the valve is mounted independently of the master cylinder. This form is adapted for application to tractors already provided with hydraulic braking systems. In this form, the invention provides a separate form of valve housing, indicated at 130, which is connected to the master brake cylinder (not shown) by means of a pressure conduit 131 and which is also connected by pressure conduits 132 and 133 to the individual rear wheel brake mechanisms, respectively. An additional fluid pressure conduit 134 also extends from the valve housing 130 to the usual fluid reservoir associated with the hydraulic brake master cylinder.

The valve housing is formed of a generally cup-shaped member 135 which, as indicated in Figure 14, has a hexagonal exterior surface adapted for application of a wrench thereto, and a closure cap 136 which is likewise hexagonally shaped and which is screw threaded into the cup-shaped member 135, as best shown in Figure 13, to complete the housing. The conduits 31 to 34, inclusive, are connected directly to the cap member 136 by means of fluid passageways 137 to 140, inclusive, respectively. The latter passageways make right-angled turns, as best indicated in Figure 13, and enter the valve housing through the flat inner face 141 of the cap 136.

Mounted within a central bore in the cap 136 is a valve operating rod 143 having welded thereto a collar 144 which seats within a counterbore opening at the inner end of the central opening of the cap and serves to prevent outward movement of the collar 144 under the influence of internal pressure. A suitable packing ring 145 serves to prevent leakage around the valve rod. The inner extremity 146 of the rod 143 is flattened, as best shown in Figure 14, and extends into a slot or rectangular opening in a movable valve element 147. The valve element 147 is identical to the element 57 described in connection with the first modification and is provided with an arcuate groove 148 which is at all times in communication with passage 140. A pin 149, extending through the flattened portion 146 of the rod 143, serves to hold the movable valve element 147 on the rod and a spring 150, positioned between the bottom of the cup-shaped housing member 135 and the valve element 147 holds the latter against the flat face 141 of the cap 136 in order to prevent leakage.

As in the previous modifications of the invention, when the valve 147, as viewed in Figure 12, is shifted from its normal central position, shown in dotted lines in that figure, to its lefthand position, communication between the passage 137 and passage 138 is cut off and the passage 140 is connected to passage 138. As a result, upon actuation of the master cylinder under these conditions, fluid pressure from line 131 will pass through passage 139 and conduit 133 to only one of the rear wheel brakes, the brake on the other rear wheel being connected through line 132, passage 137, groove 148, passage 140, and line 134 to the fluid reservoir. When the valve 147 is shifted in the opposite direction or to the right, as viewed in Figure 12, these connections are reversed and the brake connected with line 132 is applied while the other brake is released.

Valve 147 is operated by means of a lever 152 fixed to the valve operating rod 143 and provided at its outer or lower end with a stud 153 upon which is pivoted a floating lever 154. The upper end of the floating lever is connected by means of a rod 155 to a member 156 which is fixed with respect to the steering column 157 of the tractor by any suitable means such as a nut 158. The member 157 is provided with an upstanding stud 159 through which the rod 155 slidably extends, the stud 159 being rotatable with respect to the member 156 to permit angular movement of the rod 155 with respect to the member 156. Fixed to the rod 155, at opposite sides of the stud 159, are a pair of stop collars 160 and springs 161 are positioned between the stop collars and the stud for resiliently centering the rod 155 with respect to the member 156. The springs 161 are sufficiently stiff to effect a shifting of valve 147 when the steering column 157 is rotated, but they will yield to permit movement of member 156 and stud 159 after the valve 147 has come up against stop pins 162 for limiting movement of the valve element in either direction. It will be observed that when the steering column 157 is rotated to the right, as viewed in Figure 12, valve element 147 will be rotated to the left. Accordingly, the righthand brake should be connected to the pressure conduit 133 and the lefthand brake should be connected to pressure conduit 132.

The rear end of the floating lever 154 is connected by means of a rod 164 to a stud 165 rotatably positioned upon the hub 166 of a hand lever 167. The hub 166 is journalled upon a pin 168 which is mounted upon a supporting plate 169 that may be mounted in fixed position in any suitable manner upon the tractor. The pin 168 is threaded at its outer end and provided with a nut 170 and a spring 171 is positioned between the nut 170 and the hub 166 of the hand lever in order to hold the hand lever resiliently against the plate 169. A pair of balls 172 adapted to fit within complementary recesses in the hub 166 and plate 169 serve to resiliently hold the hand lever against displacement from its central position. It will be observed that by manual operation of the hand lever 167, valve 147 may be shifted at any time regardless of the position of the steering column and member 156.

In Figs. 16 to 21, inclusive, is shown an improved form of valve construction adapted to be utilized in place of the control valve 57 to 65, inclusive, in the form of construction shown in Figs. 3 to 6.

Referring to Fig. 16 there is shown fragmentarily a master cylinder indicated generally at 180 which master cylinder assembly may be similar in all respects to that illustrated in Figs. 3 and 4 except that there is omitted the passages 43 and 44 of the structure shown in Figs. 3 and 4 and there is utilized an improved form of control valve hereinafter described.

The control valve in the form of the invention shown in Figs. 16 to 21, inclusive, includes a casting indicated generally at 182 which is provided with a suitable cylindrical projection 183 adapted to fit within a corresponding opening in the master cylinder member 180 and close that opening. A packing 184 is provided to prevent leakage at the opening and the casting 182 is secured to the master cylinder element by means of four cap screws (not shown) which extend through the openings 185 in the casting 182. The casting 182 is provided with a central bore 186 in which is fitted a valve operating shaft 187. A suitable operating lever 188 is fixed to the shaft 187 by means of a nut 189, the arrangement being similar to the mounting of lever 70 in Figs. 1 to 6, inclusive. The casting 182 is provided with three passages 190, 191 and 192 extending parallel to the bore 186 entirely through the casting. The outer ends of the passages 190, 191 and 192 are counterbored and threaded for the reception of suitable pipe fittings as best shown in connection with passages 190 and 192 in Fig. 16.

There is provided at the inner side of the casting 182 a unitary rubber disc indicated generally at 195 which serves the combined functions of a valve seat and also a seal for the bore 186, passages 190, 191 and 192, as well as the opening within which the projection 183 of the casting 182 fits. This rubber disc, which is best shown in Figs. 16, 18 and 19, is provided with a central opening through which the shaft 187 extends and an upstanding fin or cylindrical projection 196 which is forced against the shaft 187 by the internal pressure and serves to seal the bore 186. A similar upstanding fin or projection 197 is provided at the periphery of the disc 195 and serves to seal the opening in the master cylinder 180. Intermediate the sealing rims 196 and 197 the disc is provided with a flat annular surface 198 which acts as a valve seat. The opposite side of the disc is provided with six pins or projections 200, three of which fit within suitable openings formed in the casting 182 and the remaining three fit within counterbores for the passages 190, 191 and 192 as best shown in Fig. 16. The three projections which fit within the counterbores are provided with axial passageways 190', 191' and 192' communicating with the passages 190, 191 and 192, respectively. These projections 200 serve to prevent rotation of the valve seat disc with respect to the casting 182 and the openings 190', 191' and 192' serve as extensions of the passages 190, 191 and 192 to the inner surface of the valve disc.

As best shown in Figs. 16, 20 and 21 there is provided a stamped sheet metal valve element indicated generally at 202 having an upstanding central portion provided with a square opening 203 adapted to fit upon a square extremity 204 on the valve operating shaft 187. A suitable pin 205 serves to prevent removal of the valve from the square extremity of the valve shaft. The peripheral portions of the valve 202 seat against the annular seating surface 198 on the rubber disc 195 and are provided with a pair of arcuate slots 206 and 207 adapted to cooperate with the openings 190' and 192' in the valve disc. The periphery of the valve 202 is also provided with a groove 208 in its under or valve seat contacting surface which groove overlies the opening 191' in the valve disc in the manner best shown in dotted lines in Fig. 17. The arrangement is such that when the valve is in its central position, indicated in Figs. 16 and 17 of the drawings, passages 190 and 192 are in communication with the interior of the master cylinder 180 but no communication is provided between passageway 191 and either of the passageways 190 or 192. When the valve 202 is rotated clockwise from the position shown in Fig. 17 groove 208 is moved into a position in which it connects passages 190 and 191 while at the same time closing communication between the master cylinder 180 and the passage 190. At the same time because of the length of the slot 207, passage 192 remains in communication with the master cylinder. When the valve is operated in the reverse direction passages 191 and 192 are connected through groove 208 leaving only passage 190 in communication with the master cylinder 180. A helical spring 209 is provided for resiliently urging the valve element 202 against its seat at all times.

As in the form of the invention described in greater detail in connection with Figs. 3 and 4, passages 190 and 192 are connected, respectively, to the brake mechanisms on the left and right hand driving wheels so that when the valve is rotated clockwise from the position shown in Fig. 17 and the brakes applied only the right-hand driving wheel brake will be applied and vice versa. The passageway 191 is connected by any suitable piping (not shown) to the reservoir commonly associated with the master cylinder of the hydraulic brake mechanism and thus serves the same purpose as the passageway 43—44 in Figs. 3 and 4, namely the function of connecting the inoperative brake to the reservoir to insure release of the same.

It will be observed that the form of control valve just described operates to produce identically the same results as the control valves described in connection with the preceding modifications. It has been found, however, that it operates more efficiently, is highly effective in preventing leakage and is exceedingly inexpensive to manufacture and assemble as compared with the variations previously described.

It is apparent that there are provided in accordance with the present invention several practical forms of brake applying and controlling mechanism adapted to facilitate steering of a tractor and particularly to supplement the normal steering operation accompanied by rotating front dirigible wheels. It will be apparent that various other modifications in the arrangement of the parts and details of construction are available within the spirit of the invention and within the scope of the appended claims.

What is claimed is:

1. In a tractor having a pair of rearwardly positioned driving wheels, one on each side thereof, a front dirigible wheel, means for turning said dirigible wheel at an angle to the driving wheels to steer the tractor, a brake on each of said driving wheels, a common brake actuator for both of said brakes, a separate connection between said actuator and each brake, and means connected with said dirigible wheel turning means and actuated automatically when said dirigible wheel is turned more than a predetermined angle with respect to the rear wheels to render inoperative the connection between said actuator and the brake on the driving wheel located on the outside of the curved path traversed by the tractor when said dirigible wheel is so turned.

2. In a tractor having a pair of rearwardly positioned driving wheels, one on each side thereof, a front dirigible wheel, means for turning said dirigible wheel at an angle to the driving wheels to steer the tractor, a hydraulically actuated brake on each of said driving wheels, a brake master cylinder, a separate fluid connection between said master cylinder and each brake, and a valve connected with said dirigible wheel turning means and actuated automatically when said dirigible wheel is turned more than a predetermined angle with respect to the rear wheels to close the fluid connection between said master cylinder and the brake on the driving wheel located on the outside of the curved path traversed by the tractor when said dirigible wheel is so turned.

3. In a tractor having a pair of rearwardly positioned driving wheels, one on each side thereof, a front dirigible wheel, means for turning said dirigible wheel at an angle to the driving wheels to steer the tractor, a hydraulically actuated brake on each of said driving wheels, a brake master cylinder, a reservoir associated with said master cylinder, a separate fluid connection between said master cylinder and each brake, and means including a valve connected with said dirigible wheel turning means and actuated automatically when said dirigible wheel is turned more than a predetermined angle with respect to the rear wheels to close the fluid connection between said master cylinder and the brake on the driving wheel located on the outside of the curved path traversed by the tractor when said dirigible wheel is so turned, and to vent said last named fluid connection to said reservoir.

4. In a tractor having a pair of rearwardly positioned driving wheels, one on each side thereof, a front dirigible wheel, means for turning said dirigible wheel at an angle to the driving wheels to steer the tractor, a brake on each of said driving wheels, a common brake actuator for both of said brakes, a separate connection between said actuator and each brake, and means connected with said dirigible wheel turning means and actuated automatically when said dirigible wheel is turned more than a predetermined angle with respect to the rear wheels to render inoperative the connection between said actuator and the brake on the driving wheel located on the outside of the curved path traversed by the tractor when said dirigible wheel is so turned, and manual means operable at all times for controlling the operation of said last named means.

5. In a tractor having a pair of rearwardly positioned driving wheels, one on each side thereof, a front dirigible wheel, means for turning said dirigible wheel at an angle to the driving wheels to steer the tractor, a hydraulically actuated brake on each of said driving wheels, a brake master cylinder, a separate fluid connection between said master cylinder and each brake, and a valve connected with said dirigible wheel turning means and actuated automatically when said dirigible wheel is turned more than a predetermined angle with respect to the rear wheels to close the fluid connection between said master cylinder and the brake on the driving wheel located on the outside of the curved path traversed by the tractor when said dirigible wheel is so turned, and manual means operable at all times for controlling the operation of said last named means.

6. In a tractor having a pair of rearwardly positioned driving wheels, one on each side thereof, a front dirigible wheel, means for turning said dirigible wheel at an angle to the driving wheels to steer the tractor, a hydraulically actuated brake on each of said driving wheels, a brake master cylinder including a reservoir, a separate fluid connection between said master cylinder and each brake, a four-way valve in said fluid connections adapted in one position to close communication between the master cylinder and one of said brakes and vent the fluid connection to said brake to the reservoir, and adapted in another position to similarly close and vent the fluid connection to the other brake, said valve having a normal intermediate position in which both fluid connections pass without interruption to the master cylinder, an operating member for said valve, a floating lever pivoted on said operating lever, a connection between one end of said floating lever and said dirigible turning means effective to shift said four-way valve to close and vent one of said fluid connections when the dirigible wheel is turned beyond a predetermined angle with respect to the driving wheels in order to render inoperative the brake on the outside wheel, and manual means connected to the opposite end of the floating lever for actuating said valve independently of said dirigible wheel turning means.

HOMER T. LAMBERT.
WILLIAM B. LUTES.